(12) United States Patent
Lee et al.

(10) Patent No.: US 12,157,024 B2
(45) Date of Patent: Dec. 3, 2024

(54) SPRINKLER SYSTEM

(71) Applicant: New Asiajoint Co., Ltd., Yeoju-si (KR)

(72) Inventors: Sang Heon Lee, Seoul (KR); Dong Il Han, Yeoju-si (KR)

(73) Assignee: New Asiajoint Co., Ltd., Yeoju-si (KR)

( * ) Notice: Subject to any disclaimer, the term of this patent is extended or adjusted under 35 U.S.C. 154(b) by 119 days.

(21) Appl. No.: 17/612,550

(22) PCT Filed: May 14, 2020

(86) PCT No.: PCT/KR2020/006374
§ 371 (c)(1),
(2) Date: Nov. 18, 2021

(87) PCT Pub. No.: WO2020/235869
PCT Pub. Date: Nov. 26, 2020

(65) Prior Publication Data
US 2022/0305312 A1  Sep. 29, 2022

(30) Foreign Application Priority Data

May 23, 2019 (KR) .......................... 10-2019-0060560

(51) Int. Cl.
*F16L 41/12* (2006.01)
*A62C 35/68* (2006.01)
*F16L 23/04* (2006.01)

(52) U.S. Cl.
CPC .............. *A62C 35/68* (2013.01); *F16L 23/04* (2013.01); *F16L 41/12* (2013.01)

(58) Field of Classification Search
CPC . F16L 41/00; F16L 41/08; F16L 41/04; F16L 41/06; F16L 41/086; F16L 41/088; F16L 41/12
See application file for complete search history.

(56) References Cited

U.S. PATENT DOCUMENTS

| 5,040,729 A | 8/1991 | Carrozza |
| 2003/0178850 A1 | 9/2003 | Dole et al. |
| 2019/0032825 A1* | 1/2019 | McNamara ........... F16L 41/021 |

FOREIGN PATENT DOCUMENTS

| CN | 2540545 Y | 3/2003 |
| CN | 101715526 A | 5/2010 |

(Continued)

OTHER PUBLICATIONS

WO 0159352 translation (Year: 2001).*

(Continued)

*Primary Examiner* — Aaron M Dunwoody
(74) *Attorney, Agent, or Firm* — Knobbe, Martens, Olson, & Bear, LLP (57) ABSTRACT

The present invention relates to a sprinkler system, and more specifically, to a sprinkler system which can be assembled without welding. To this end, the sprinkler system according to the present invention comprises: a main pipe through which fluid is supplied from an externa source; a first branch pipe for branching the fluid supplied through the main pipe; a second branch pipe for branching the fluid supplied through the first branch pipe so that said fluid is supplied to a sprinkler; and a detachable first coupler for interconnecting the main pipe, the first branch pipe, and the second branch pipe.

7 Claims, 9 Drawing Sheets

(56) References Cited

FOREIGN PATENT DOCUMENTS

| | | |
|---|---|---|
| CN | 206093330 U | 4/2017 |
| JP | H8-338579 A | 12/1996 |
| JP | 2007-146990 A | 6/2007 |
| JP | 2009-507200 A | 2/2009 |
| KR | 20-0343773 Y1 | 3/2004 |
| KR | 20-0347034 Y1 | 4/2004 |
| KR | 10-2008-0045252 A | 5/2008 |
| KR | 10-1244771 B1 | 3/2013 |
| KR | 10-1488337 B1 | 1/2015 |
| WO | WO-0159352 A2 * | 8/2001 .............. F16L 41/12 |

OTHER PUBLICATIONS

Office Action of corresponding CN patent application No. 202080036716.0. (issued on Dec. 5, 2022).
Office Action of corresponding JP patent application No. 2021-569497 (issued on Nov. 15, 2022).
International Search Report for PCT/KR2020/006374, dated Aug. 13, 2020, in 4 pages.

* cited by examiner

SPRINKLER SYSTEM

TECHNICAL FIELD

The present invention relates to a sprinkler system, and more particularly, to a sprinkler system that is can be assembled in a non-welding manner.

BACKGROUND ART

In general, sprinklers equipped with sensors for early extinguishing of a fire by automatically spraying a high-pressure fluid by detecting the fire when the fire occurs around ceilings are installed on each floor of buildings such as commercial buildings or apartment buildings.

To this end, a main pipe through which a fluid is supplied from an external source is installed, an inlet pipe in which a plurality of sprinklers are installed is installed in communication with the main pipe, and a branch pipe for supplying the fluid to the sprinklers is installed in the inlet pipe.

However, in the related art, in order for the inlet pipe and the branch pipe to communicate with each other, the branch pipe is installed in a branch hole formed in the inlet pipe in a welding manner. However, in this way, the fluid may leak due to faulty welding, and in the future, a maintenance/repair operation is not easy.

Further, many assembly man hours are required, the number of components is large, and thus construction costs are wasted.

In addition, when the diameter of the branch hole formed in the inlet pipe is increased so as to increase the flow rate of a fluid supplied to the sprinkler, the fluid may leak.

Thus, reduction of the above problems is required.

DISCLOSURE

Technical Tasks

The present invention is directed to providing a sprinkler system that is can be assembled in a non-welding manner without using a welding manner.

The present invention is also directed to providing a sprinkler system that allows assembly man hours to be reduced and construction costs to be reduced by simplifying a configuration thereof.

The present invention is also directed to providing a sprinkler system capable of effectively preventing leakage of a branched fluid even when the diameter of a branch hole formed in a branch pipe through which the fluid is supplied to a sprinkler increases.

Technical Solution

One aspect of the present invention provides a sprinkler system including a main pipe through which a fluid is supplied from an external source, a first branch pipe through which the fluid supplied through the main pipe branches off, a second branch pipe through which the fluid supplied through the first branch pipe branches off so that the fluid is supplied to a sprinkler, and a detachable first coupler that interconnects the main pipe, the first branch pipe, and the second branch pipe.

The first coupler may include a pair of first body parts facing each other and a first fastening part that fastens the pair of first body parts to each other.

Locking protrusions inserted into fastening grooves formed in the pipes facing each other may be formed on two sides of the first body parts in a width direction.

The main pipe and the first branch pipe may be formed to have the same outer diameter, and the pair of locking protrusions may be formed to have the same radius of curvature.

The first branch pipe and the second branch pipe may be formed to have different outer diameters, and among the pair of locking protrusions, one locking protrusion may be formed to have a radius of curvature corresponding to the outer diameter of the first branch pipe, and the other locking protrusion may be formed to have a radius of curvature corresponding to the outer diameter of the second branch pipe.

An extension part integrally extending to be adjacent to an end of the second branch pipe may be formed in the first branch pipe.

The sprinkler system may further include a second coupler that interconnects the second branch pipe and the sprinkler so that the fluid supplied to the second branch pipe is branched off to flow to the sprinkler.

The second coupler may include a second body part that surrounds a circumference of a branch hole formed in the second branch pipe, a second fixing part that is disposed to be opposite to the second body part with respect to the second branch pipe and fixes the second body part to the second branch pipe, and a second gasket part that is disposed between the second body part and an outer circumferential surface of the second branch pipe and prevents the leakage of the branched fluid while being pressed by the second body part, wherein a degree of pressing of the second gasket part by the second body part increases as a distance from the branch hole increases.

A flange through which the second fixing part is coupled may be formed in the second body part, and a first cut surface may be formed in the flange so that a lower end of the flange is located above a center of the second branch pipe.

A second cut surface formed with a step difference to be located above the first cut surface may be formed in the flange.

A pressing surface extending along the outer circumferential surface of the second branch pipe to press the second gasket part may be formed in the second body part, and the second gasket part and the pressing surface may extend to a lower end of the flange.

A guide rib inserted into an inner circumferential surface of the branch hole may be formed in the second body part.

The second fixing part may include a second fixing member that applies a fastening force while being supported on an outer circumferential surface of an inlet pipe, and the second fixing member may move the flange downward and, at the same time, deform the flange radially inward.

The second branch pipe and the sprinkler may have the same outer diameter.

Advantageous Effects

In a sprinkler system having the above-described configuration according to the present invention, since a main pipe and first and second branch pipes are interconnected through a detachable first coupler, welding is not required. Thus, problems such as leakage due to bad welding can be prevented, and a maintenance/repair operation is easy.

Further, since pipes and a sprinkler are connected in a non-welding manner, assembly man hours are reduced and construction costs are reduced.

Further, since the degree of pressing of a second gasket part by a second body part increases as a distance from a branch hole increases, the leakage of a fluid can be effectively prevented even when the diameter of the branch hole formed in the second branch pipe increases.

In addition, since a first cut surface and a second cut surface are formed so that a lower end of a flange is located above a center of the second branch pipe, when a second coupler is fastened, the flange is moved downward and, at the same time, is moved radially inward by a fastening force of a second fixing part to press a second gasket part, and thus the leakage of the branched fluid can be further effectively prevented.

EMBODIMENTS

Hereinafter, embodiments of the present invention will be described in detail with reference to the accompanying drawings so that those skilled in the art to which the present invention pertains may easily implement the present invention. The present invention may be implemented in various different forms and is not limited to the embodiments described herein. In the drawings, parts irrelevant to the description are omitted in order to clearly describe the present invention, and the same reference numerals are assigned to the same or similar components throughout the specification.

It should be understood in the present specification that the terms "include" or "have" are intended to indicate that there are features, numbers, steps, operations, components, parts, or combinations thereof that are described in the specification and do not exclude in advance the possibility of the presence or addition of one or more other features, numbers, steps, operations, components, parts, or combinations thereof.

Figure 1:
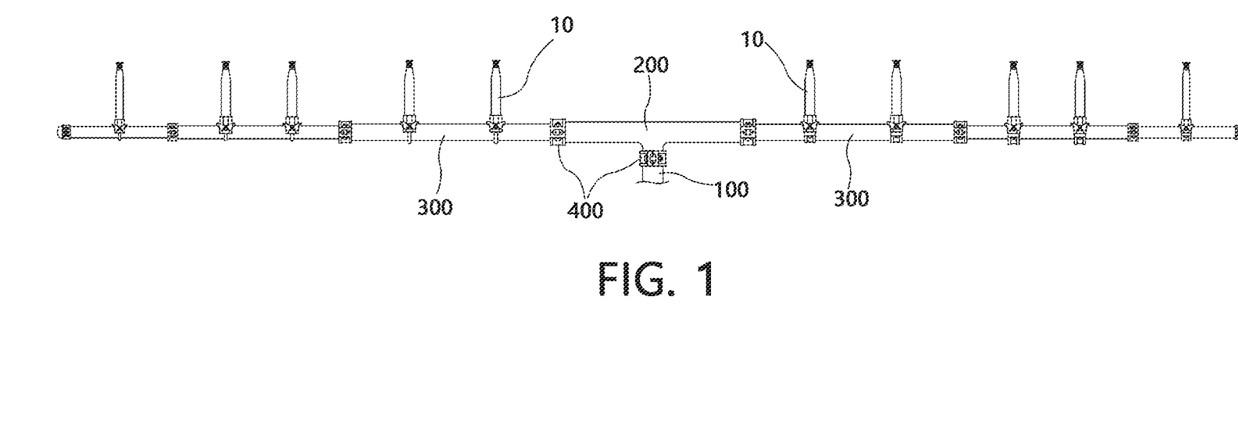
FIG. 1 is a view illustrating a sprinkler system according to the present invention.
Figure 2:
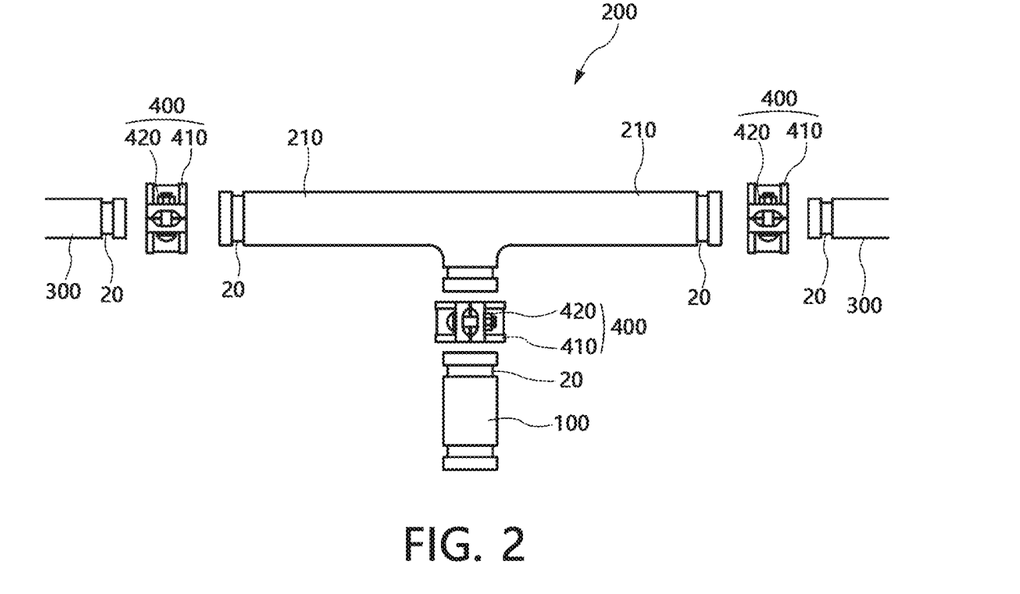
FIG. 2 is a view illustrating a state in which pipes are separated according to the present invention.
Figure 3:
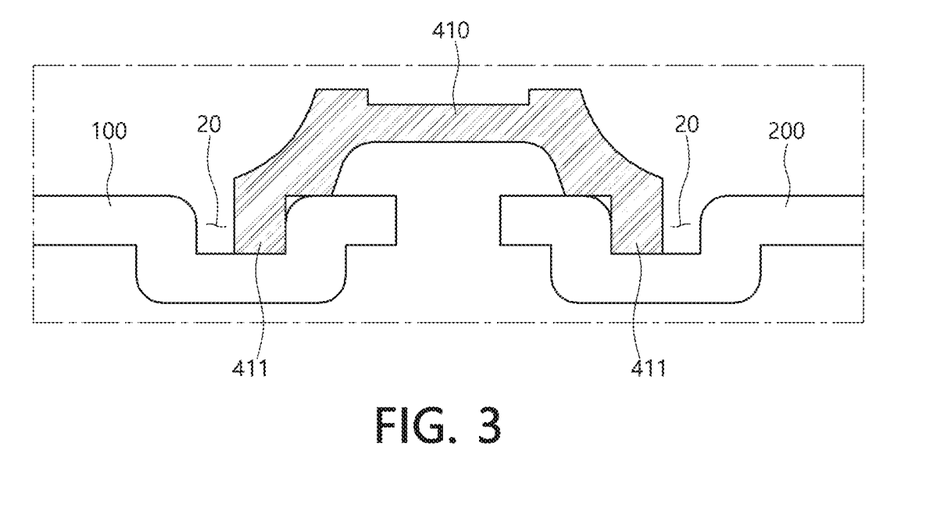
FIG. 3 is a cross-sectional view illustrating a fastened state of a first coupler according to one embodiment of the present invention.
Figure 4:
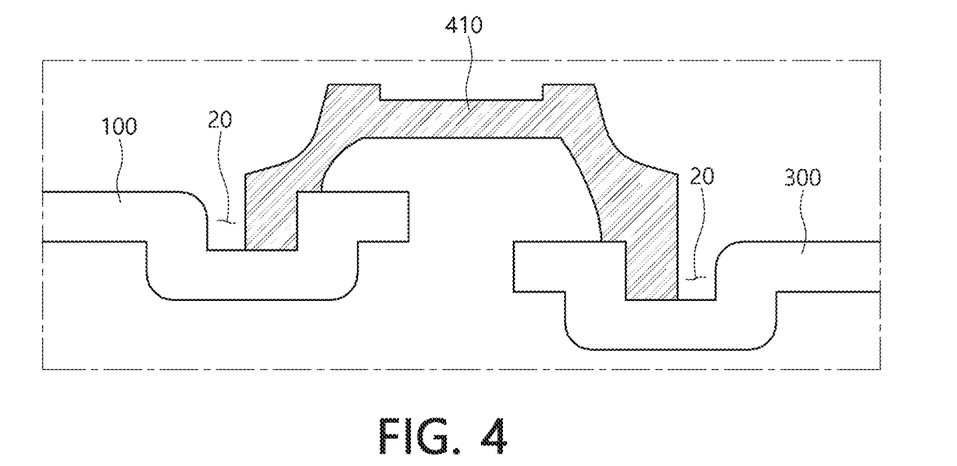
FIG. 4 is a cross-sectional view illustrating a fastened state of a first coupler according to another embodiment of the present invention.
Figure 5:
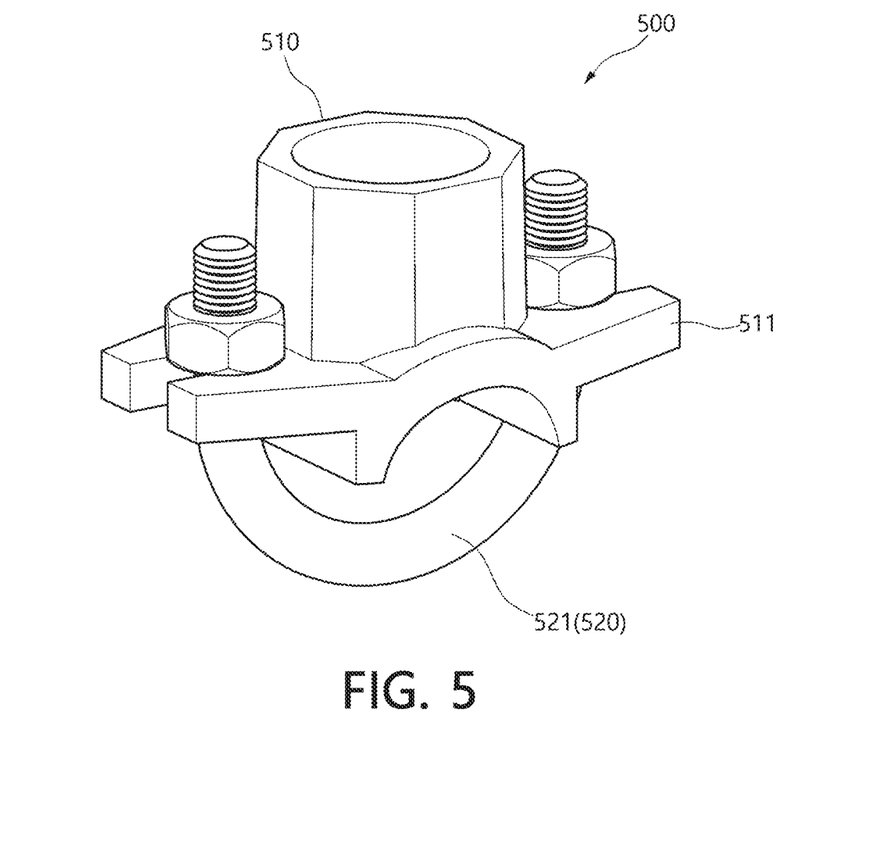
FIG. 5 is a perspective view illustrating a second coupler according to the present invention.
Figure 6:
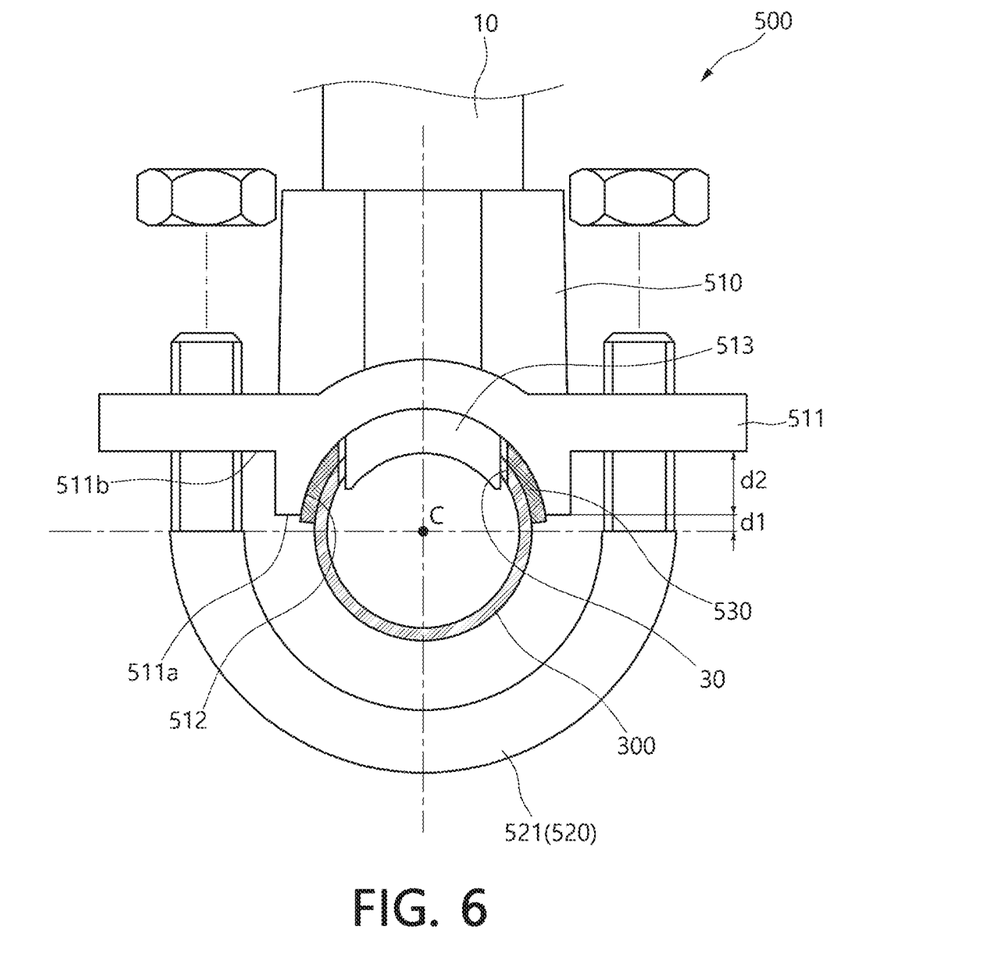
FIG. 6 is a view illustrating an unfastened state of the second coupler according to the present invention.
Figure 7:
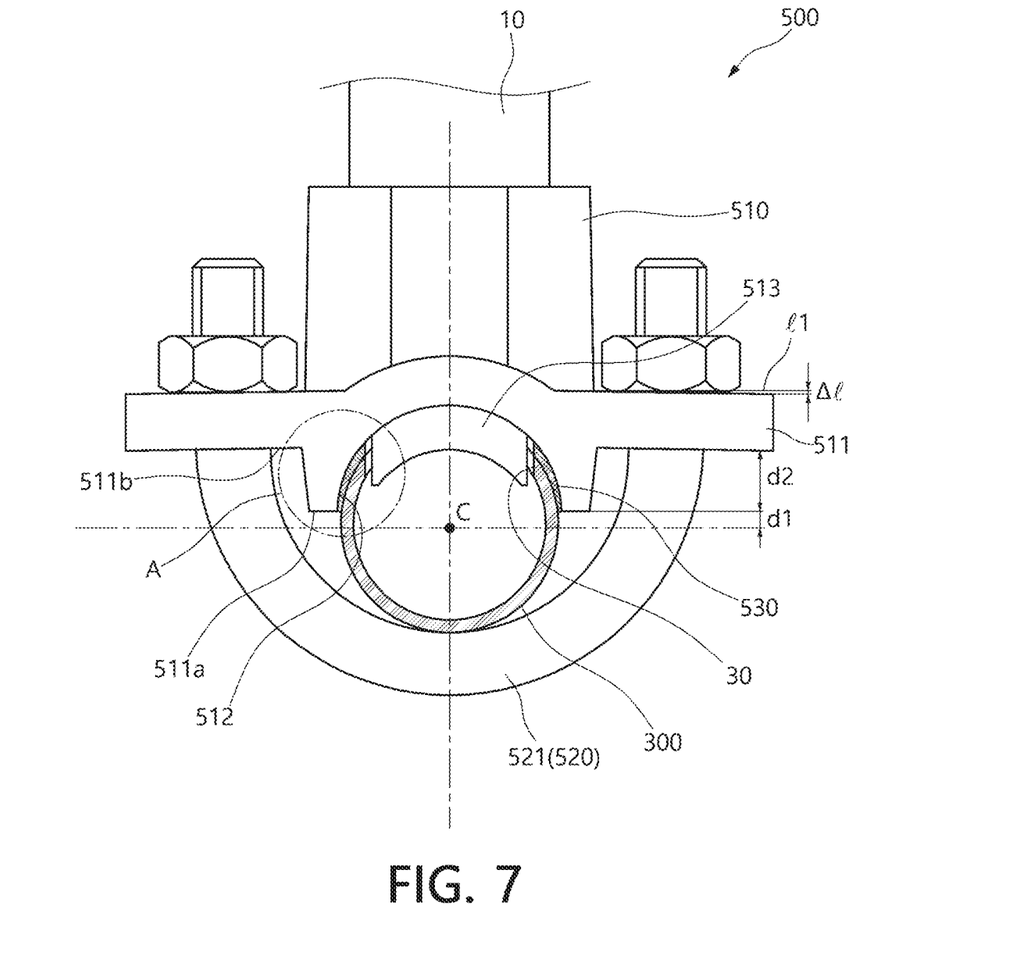
FIG. 7 is a view illustrating a fastened state of the second coupler according to the present invention.
Figure 8:
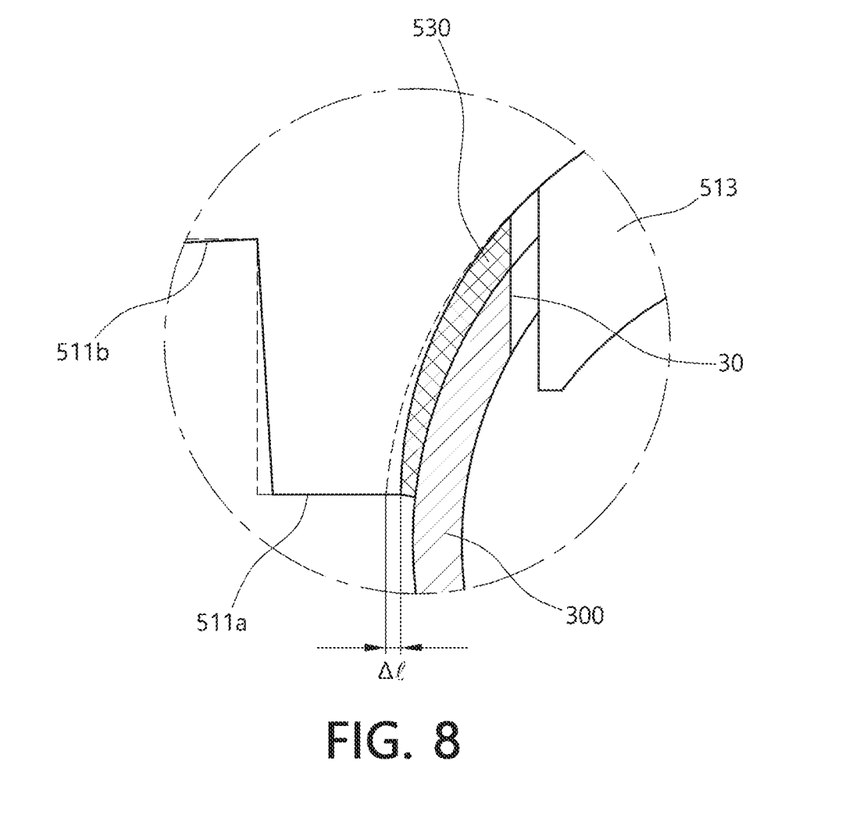
FIG. 8 is an enlarged view illustrating part A of FIG. 7.
Figure 9:
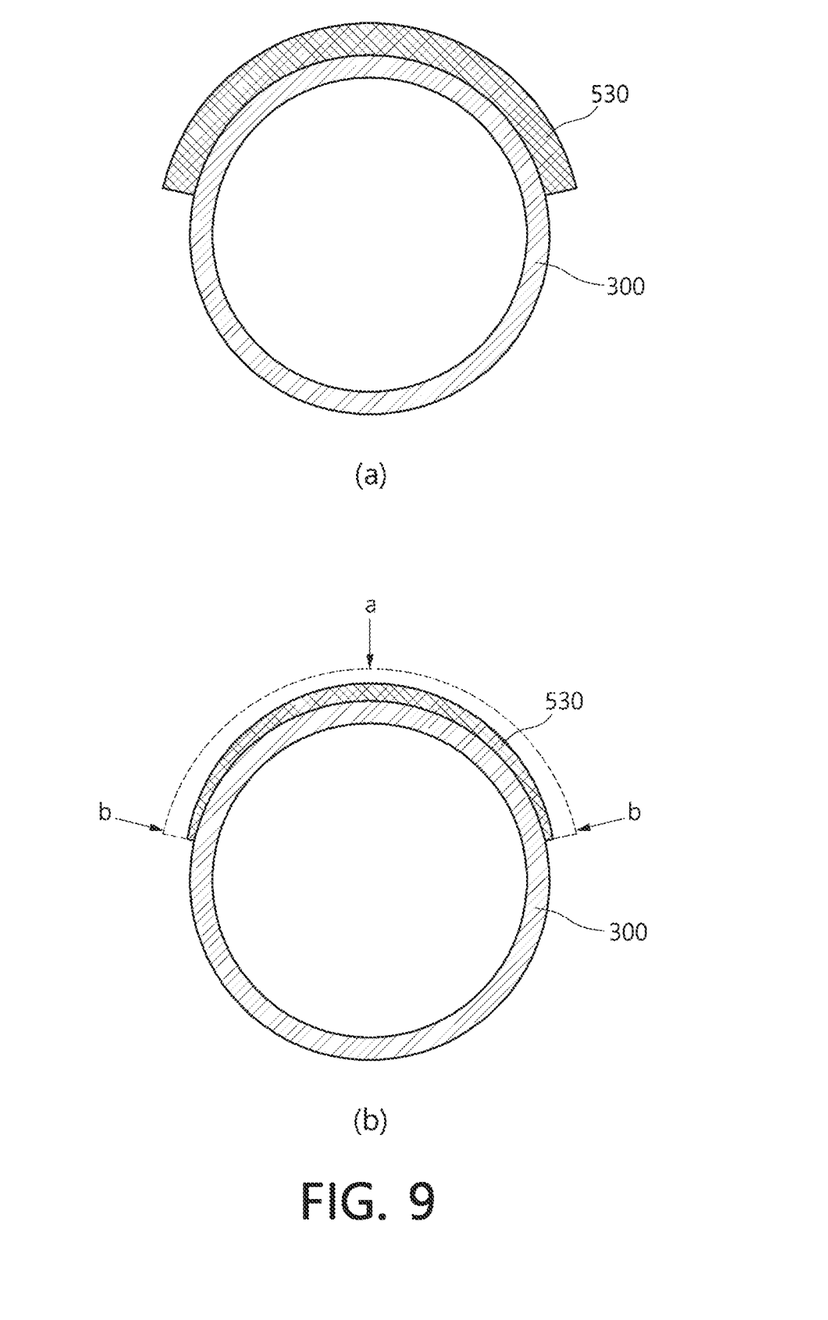
FIG. 9 includes views illustrating a state in which a second gasket part is compressed in a process of fastening the second coupler according to the present invention, wherein (a) of FIG. 9 is a view illustrating a state before fastening, and (b) of FIG. 9 is a view illustrating a fastened state.

FIG. 1 is a view illustrating a sprinkler system according to the present invention, FIG. 2 is a view illustrating a state in which pipes are separated according to the present invention, FIG. 3 is a cross-sectional view illustrating a fastened state of a first coupler according to one embodiment of the present invention, FIG. 4 is a cross-sectional view illustrating a fastened state of a first coupler according to another embodiment of the present invention, FIG. 5 is a perspective view illustrating a second coupler according to the present invention, FIG. 6 is a view illustrating an unfastened state of the second coupler according to the present invention, FIG. 7 is a view illustrating a fastened state of the second coupler according to the present invention, FIG. 8 is an enlarged view illustrating part A of FIG. 7, and FIG. 9 includes views illustrating a state in which a second gasket part is compressed in a process of fastening the second coupler according to the present invention, wherein (a) of FIG. 9 is a view illustrating a state before fastening, and (b) of FIG. 9 is a view illustrating a fastened state.

As illustrated in FIGS. 1 and 2, a sprinkler system according to the present invention includes a main pipe 100 through which a fluid is supplied from an external source, a first branch pipe 200 through which the fluid supplied through the main pipe 100 branches off, a second branch pipe 300 through which the fluid supplied through the first branch pipe 200 branches off so that the fluid is supplied to a sprinkler 10, and a detachable first coupler 400 that interconnects the main pipe 100, the first branch pipe 200, and the second branch pipe 300.

As described above, in the related art, in order for an inlet pipe and a branch pipe to communicate with each other, the branch pipe is installed in a branch hole formed in the inlet pipe in a welding manner. However, in this way, the fluid may leak due to bad welding, and in the future, a maintenance/repair operation is not easy. However, in the sprinkler system according to the present invention, since the main pipe 100, the first branch pipe 200, and the second branch pipe 300 are interconnected using the detachable first coupler 400, leakage due to bad welding can be prevented, the maintenance/repair operation is easy in the future, and since the respective pipes and the sprinkler 10 are connected in a non-welding manner, assembly man hours and construction costs are reduced.

In this case, the first coupler 400 may include a pair of first body parts 410 facing each other and a first fastening part 420 that fixedly fastens the pair of first body parts 410 to each other.

That is, in a state in which an end of the main pipe 100 and an end of the first branch pipe 200 are arranged adjacent to each other, after the end of the main pipe 100 and the end of the first branch pipe 200 are located and arranged between the pair of first body parts 410, the pair of first body parts 410 are fixedly fastened in a simple manner using the first fastening part 420. Thus, as compared to a welding method according to the related art, the assembly man hours are reduced, and labor costs can be reduced through this.

Further, in the case of the first branch pipe 200 and the second branch pipe 300, in a state in which an end of the first branch pipe 200 and an end of the second branch pipe 300 are arranged adjacent to each other, after the end of the first branch pipe 200 and the end of the second branch pipe 300 are located and arranged between the pair of first body parts 410, the pair of first body parts 410 are fixedly fastened in a simple manner using the first fastening part 420.

As illustrated in FIGS. 3 and 4, locking protrusions 411 inserted into fastening grooves 20 formed in the pipes facing each other may be formed on both sides of the first body part 410 in the width direction.

That is, the first body part 410 has one locking protrusion 411 inserted into the fastening groove 20 formed in one pipe and the other locking protrusion 411 inserted into the fastening groove 20 formed in the other pipe. In this way, after the locking protrusions 411 are inserted into the fastening grooves 20, the pipe is supported so that the pipe is not widened in an axial direction due to the pressure of the fluid inside the pipe.

Further, a first gasket part (not illustrated) having elasticity to prevent the fluid flowing inside the pipe from leaking may be provided inside a space defined by the first body part 410 and the locking protrusions 411.

In this case, as illustrated in FIG. 3, the main pipe 100 and the first branch pipe 200 may be formed to have the same outer diameter, and the pair of locking protrusions 411 may be formed to have the same radius of curvature.

That is, the main pipe 100 and the first branch pipe 200 may be interconnected using the first coupler 400 according to the embodiment of the present invention, the locking protrusions 411 formed in the first coupler 400 are formed to have the radius of curvature corresponding to the outer diameter of the fastening grooves 20 formed in the main pipe 100 and the first branch pipe 200, and thus the main pipe 100 and the first branch pipe 200 can be interconnected in a simple manner, and at the same time, the leakage of the fluid can be effectively prevented.

Alternatively, as illustrated in FIG. 4, the first branch pipe 200 and the second branch pipe 300 are formed to have different outer diameters, and among the pair of locking protrusions 411, one locking protrusion 411 may be formed to have the radius of curvature corresponding to the outer diameter of the first branch pipe 200, and the other locking protrusion 411 may be formed to have the radius of curvature corresponding to the outer diameter of the second branch pipe 300.

That is, the first branch pipe 200 and the second branch pipe 300 having different outer diameters may be interconnected using the first coupler 400 according to another embodiment of the present invention. In this case, the pair of locking protrusions 411 are formed on the first coupler 400, one locking protrusion 411 is formed to have the radius of curvature corresponding to the outer diameter of the first branch pipe 200, and the other one locking protrusion 411 is formed to have the radius of curvature corresponding to the outer diameter of the second branch pipe 300. Thus, the first branch pipe 200 and the second branch pipe 300 may be interconnected in a simple manner and the leakage of the fluid can be prevented effectively.

In this case, as illustrated in FIGS. 1 and 2, an extension part 210 integrally extending to be adjacent to the end of the second branch pipe 300 may be formed in the first branch pipe 200.

When the extension part 210 is not formed in the first branch pipe 200, a plurality of other pipes are provided between the first branch pipe 200 and the second branch pipe 300 to connect the first branch pipe 200 and the second branch pipe 300, and it is troublesome to connect all of these pipes. However, in this way, when the extension part 210 is formed in the first branch pipe 200, since the first branch pipe 200 and the second branch pipe 300 may be directly connected using the first coupler 400, the number of components is reduced, and thus the assembly man hours can be reduced and the construction costs can be reduced.

In this case, the sprinkler system may further include a second coupler 500 that interconnects the second branch pipe 300 and the sprinkler 10 so that the fluid supplied to the second branch pipe 300 is branched off to flow to the sprinkler 10.

That is, since the sprinkler 10 is directly fixed to the second branch pipe 300 using the second coupler 500 in a simple manner, the assembly man hours can be reduced, and labor costs can be reduced through this, as compared to the welding method according to the related art.

As illustrated in FIGS. 5 to 7, the second coupler 500 includes a second body part 510 that surrounds a circumference of the branch hole 30 formed in the second branch pipe 300, a second fixing part 520 that is disposed to be opposite to the second body part 510 with respect to the second branch pipe 300 and fixes the second body part 510 to the second branch pipe 300, and a second gasket part 530 that is disposed between the second body part 510 and an outer circumferential surface of the second branch pipe 300 and prevents the leakage of the fluid branched off while the fluid is pressed by the second body part 510.

That is, since the second body part 510 surrounding the circumference of the branch hole 30 is installed in a simple manner using the second fixing part 520, the assembly man hours can be reduced, and thus the construction cost can be reduced, and since the second gasket part 530 is provided between the second body part 510 and the outer circumferential surface of the second branch pipe 300, the leakage of the fluid can be effectively prevented.

In this case, in order to increase the flow rate of the fluid supplied to the sprinkler 10, an increase in the diameter of the branch hole 30 formed in the second branch pipe 300 is required, and even in this case, the degree of pressing of the second gasket part 530 by the second body part 510 increases as a distance from the branch hole 30 increases so as to effectively prevent the leakage of the fluid.

When the diameter of the branch hole 30 increases, the size of the second gasket part 530 for preventing the leakage of the fluid also increases. When the size of the second gasket part 530 increases, it may be difficult to evenly press the second gasket part 530.

In particular, when the size of the second gasket part 530 increases to the extent that a circumference of the second gasket part 530 is disposed adjacent to a center c of the second branch pipe 300, it may be more difficult to evenly press the second gasket part 530. In this case, a case in which the circumference of the second gasket part 530 is disposed adjacent to the center c of the second branch pipe 300 means that, as illustrated in FIG. 6, the second gasket part 530 extends starting from a portion adjacent to the branch hole 30 of the second branch pipe 300 and the circumference of the second gasket part 530 extending downward along a circumference of the second branch pipe 300 extends until the circumference of the second gasket part 530 is disposed adjacent to a line passing through the center c of the second branch pipe 300.

That is, in this case, when the second body part 510 is fixed to the second branch pipe 300 using the second fixing part 520, since a fastening force of the second fixing part 520 is applied vertically, the second gasket part 530 disposed adjacent to the branch hole 30 effectively seals the circumference of the branch hole 30 by the vertical fastening force, but the second gasket part 530 extending downward to be disposed adjacent to the center c of the second branch pipe 300 is not effectively pressed even when the vertical fastening force is applied.

Thus, as described above, when the degree of the pressing of the second gasket part 530 by the second body part 510 increases as the distance from the branch hole 30 increases, even when the size of the second gasket part 530 increases to the extent that the circumference of the second gasket part 530 is disposed adjacent to the center c of the second branch pipe 300, the leakage of the branched fluid can be effectively prevented.

In this case, as illustrated in FIGS. 5 to 7, a flange 511 through which the second fixing part 520 is coupled is formed in the second body part 510, and a first cut surface 511a may be formed on the flange 511 so that a lower end of the flange 511 is located above the center c of the second branch pipe 300. In this way, a state in which the lower end of the flange 511 is located above the center c of the second branch pipe 300 means that, as illustrated in FIG. 6, the lower end of the flange 511 is disposed above the line passing through the center c of the second branch pipe 300 by a predetermined distance d1.

That is, in this way, when the first cut surface 511a is formed in the flange 511, and thus the lower end of the flange 511 is located above the center c of the second branch pipe 300, when the fastening force is applied through the second fixing part 520, the fastening force is applied so that the flange 511 moves downward, and at the same time, radially inward. Thus, only the vertical fastening force is applied to a portion of the second gasket part 530 disposed adjacent to the branch hole 30, and the vertical fastening force and the radially inward fastening force are simultaneously applied to a portion of the second gasket part 530 disposed adjacent to the center c of the second branch pipe 300.

Since the radially inward fastening force increases as the distance from the branch hole 30 increases, the degree of the pressing of the second gasket part 530 by the second body part 510 increases as the distance from the branch hole 30 increases, and thus even when the size of the second gasket part 530 increases, the leakage of the fluid can be effectively prevented.

In this case, as illustrated in FIGS. 5 to 7, the flange 511 may have a second cut surface 511b formed with a step difference to be located above the first cut surface 511a. In this way, a state in which the second cut surface 511b is located above the first cut surface 511a means that, as illustrated in FIG. 6, the second cut surface 511b is located above a line connecting the first cut surface 511a by a predetermined distance d2.

In this way, when the second cut surface 511b is formed, the thickness of the flange 511 is partially reduced, and thus as illustrated in FIGS. 7 and 8, deformation of the flange 511 is likely to occur. The flange 511 is disposed at an initial position 11 before the fastening force is applied through the second fixing part 520. However, in this state, when the fastening force is applied through the second fixing part 520, as the flange 511 is deformed by a predetermined distance Δ1, the second gasket part 530 is pressed downward and, at the same time, is pressed radially inward by the predetermined distance Δ1. Thus, even when the size of the second gasket part 530 increases, the leakage of the fluid can be effectively prevented.

In particular, since the second cut surface 511b is located above the first cut surface 511a, when the fastening force of the second fixing part 520 is applied, it becomes easier to press the second gasket part 530 radially inward through the flange 511.

In this case, a pressing surface 512 extending along the outer circumferential surface of the second branch pipe 300 to press the second gasket part 530 may be formed in the second body part 510, and the second gasket part 530 and the pressing surface 512 may extend to the lower end of the flange 511.

As described above, the flange 511 is partially deformed by the fastening force of the second fixing part 520 to press the second gasket part 530 radially inward. That is, when the pressing surface 512 pressing the second gasket part 530 is formed in the second body part 510, and the second gasket part 530 and the pressing surface 512 extend to the lower end of the flange 511, a pressing force through the deformation of the flange 511 can be maximized, and thus the leakage of the fluid can be effectively prevented.

In this case, a guide rib 513 inserted into an inner circumferential surface of the branch hole 30 may be formed in the second body part 510, and thus when the second body part 510 is installed, the position of the second body part 510 can be stably fixed. That is, even when an external force is applied to the second body part 510, the second body part 510 can be prevented from rotating along the circumference of the second branch pipe 300.

Further, since the guide rib 513 is formed, the flow of the branched fluid is effectively guided after the fastening through the second fixing part 520.

In this case, the second fixing part 520 includes a second fixing member 521 that applies a fastening force while being supported on the outer circumferential surface of the second branch pipe 300, and the second fixing member 521 may adopt a U bolt supported in a manner that surrounds a portion of the outer circumferential surface of the second branch pipe 300.

When the second fixing member 521 is installed to pass through the flange 511 of the second body part 510 and the fastening force is applied, the flange 511 is moved downward, and at the same time, is deformed radially inward by the fastening force.

That is, as illustrated in (a) of FIG. 9, before the fastening force is applied, the entire thickness of the second gasket part 530 is formed to be constant. As illustrated in (b) of FIG. 9, after the fastening force is applied, an upper end of the second gasket part 530 is pressed downward but the second gasket part 530 is pressed downward and, at the same time, is also pressed radially inward toward the lower end thereof.

In this case, the outer diameter of the second branch pipe 300 and the outer diameter of the sprinkler 10 may be formed to be the same. That is, when an increase in the flow rate of the branched fluid is required, the sprinkler 10 having the same outer diameter as the outer diameter of the second branch pipe 300 may be used. In this case, the diameter of the branch hole 30 also increases. However, as described above, the second gasket part 530 is pressed downward, and at the same time, is pressed radially inward using the deformation of the flange 511 through the fastening force of the second fixing part 520. Thus, the leakage of the fluid can be effectively prevented.

Although the embodiments of the present invention have been described above, the spirit of the present invention is not limited to the embodiments presented in the present specification. Those skilled in the art who understand the spirit of the present invention could easily propose other embodiments by adding, changing, omitting, adding, or the like of components within the same scope of the spirit. Further, these other embodiments also belong to the scope of the spirit of the present invention.

The invention claimed is:

1. A sprinkler system comprising:
   a main pipe through which a fluid is supplied from an external source;
   a first branch pipe through which the fluid supplied through the main pipe branches off;
   a second branch pipe through which the fluid supplied through the first branch pipe branches off so that the fluid is supplied to a sprinkler;

a detachable first coupler that interconnects the main pipe and the first branch pipe, or interconnects the first branch pipe and the second branch pipe; and a second coupler that interconnects the second branch pipe and the sprinkler so that the fluid supplied to the second branch pipe is branched off to flow to the sprinkler extending in a first direction, wherein the second coupler comprises a second body part that surrounds a circumference of a branch hole formed in the second branch pipe, a second fixing part that is disposed to be opposite to the second body part with respect to the second branch pipe and configured to fix the second body part to the second branch pipe, and a second gasket part that is disposed between the second body part and an outer circumferential surface of the second branch pipe and configured to prevent the leakage of the branched fluid while being pressed by the second body part, wherein the second body part comprises a flange to which the second fixing part is coupled, wherein the flange comprises a first cut surface disposed at a lower end of the flange, the lower end being located above the center of the second branch pipe, and the flange further comprises a second cut surface located above the first cut surface to form a step difference between the first cut surface and the second cut surface, wherein the second body part comprises a pressing surface extending along the outer circumferential surface of the second branch pipe to press the second gasket part, and wherein the second gasket part and the pressing surface extend to the lower end of the flange, wherein the first cut surface is disposed parallel to the second cut surface and has a predetermined length in a second direction perpendicular to the first direction, wherein a step surface is provided between the first cut surface and the second cut surface so that the first cut surface and the second cut surface are arranged to form a step, wherein the second cut surface extends to a distal end of the flange, wherein the second fixing part is fastened to the flange while penetrating the flange such that the second gasket part is pressed while the flange is deformed radially inward, and wherein the degree of pressing of the second gasket part by the second body part is configured to increase as a distance from the branch hole increases.

2. The sprinkler system of claim 1, wherein the first coupler includes a pair of first body parts facing each other and a first fastening part that fastens the pair of first body parts to each other.

3. The sprinkler system of claim 2, wherein locking protrusions inserted into fastening grooves formed in the pipes facing each other are formed on two sides of the first body parts in a width direction.

4. The sprinkler system of claim 3, wherein the main pipe and the first branch pipe are formed to have the same outer diameter, and the pair of locking protrusions are formed to have the same radius of curvature.

5. The sprinkler system of claim 3, wherein the first branch pipe and the second branch pipe are formed to have different outer diameters, and among the pair of locking protrusions, one locking protrusion is formed to have a radius of curvature corresponding to the outer diameter of the first branch pipe, and the other locking protrusion is formed to have a radius of curvature corresponding to the outer diameter of the second branch pipe.

6. The sprinkler system of claim 5, wherein an extension part integrally extending to be adjacent to an end of the second branch pipe is formed in the first branch pipe.

7. The sprinkler system of claim 1, wherein the flange comprises a protrusion portion comprising the step surface, the first cut surface and the pressing surface, wherein the second gasket extends to the lower end of the protrusion portion and is disposed between the protrusion portion and the second branch pipe such that the protrusion portion of the second body part does not contact the second branch pipe.

* * * * *